United States Patent [19]

Hunt et al.

[11] Patent Number: 4,733,629

[45] Date of Patent: Mar. 29, 1988

[54] PLASTIC LOCKSEAM TUBING AND METHOD FOR MAKING

[75] Inventors: Frederic G. Hunt, Columbus; Robert D. McVay, deceased, late of Columbus, both of Ohio, by Laird R. Daubenspeck, executor

[73] Assignee: United McGill Corporation, Groveport, Ohio

[21] Appl. No.: 933,361

[22] Filed: Nov. 19, 1986

Related U.S. Application Data

[63] Continuation of Ser. No. 687,144, Dec. 28, 1984, abandoned.

[51] Int. Cl.⁴ .................................................. B63B 5/24
[52] U.S. Cl. ...................................... 114/357; 114/292; 138/129; 138/154
[58] Field of Search .......................... 114/61, 292, 357; 138/89, 122, 129, 135, 154

[56] References Cited

U.S. PATENT DOCUMENTS

| | | |
|---|---|---|
| 2,713,381 | 7/1955 | Seck .................................. 138/122 X |
| 3,199,541 | 8/1965 | Richitelli .............................. 138/129 |
| 3,446,172 | 5/1969 | Morton et al. ......................... 114/61 |
| 3,606,670 | 9/1971 | Wienand et al. ................ 138/154 X |
| 4,062,380 | 12/1977 | Hofle ..................................... 138/122 |
| 4,566,496 | 1/1986 | Menzel et al. ...................... 138/154 |

*Primary Examiner*—Sherman D. Basinger
*Attorney, Agent, or Firm*—Nies, Webner, Kurz & Bergert

[57] ABSTRACT

A thin-walled large diameter spiral plastic tube with interlocking helical seams made from a strip of polyethylene material. The strip of plastic has a thin configuration with edge constructions providing a bead formation along one edge and a groove formation along the opposite edge, which can enable an interlocked helical seam, in the spiral tube. The strip is fed into a special spiral pipe making machine for plastics which winds and interlocks the edges of the strip. Such tubing is used for ducts and pipes and, filled with expanded polystyrene beads can be used very advantageously as flotation devices. The plastic used in the strips is polyethylene, including medium and high density polyethylenes with high molecular weight (HMW).

20 Claims, 12 Drawing Figures

U.S. Patent    Mar. 29, 1988    Sheet 2 of 3    4,733,629
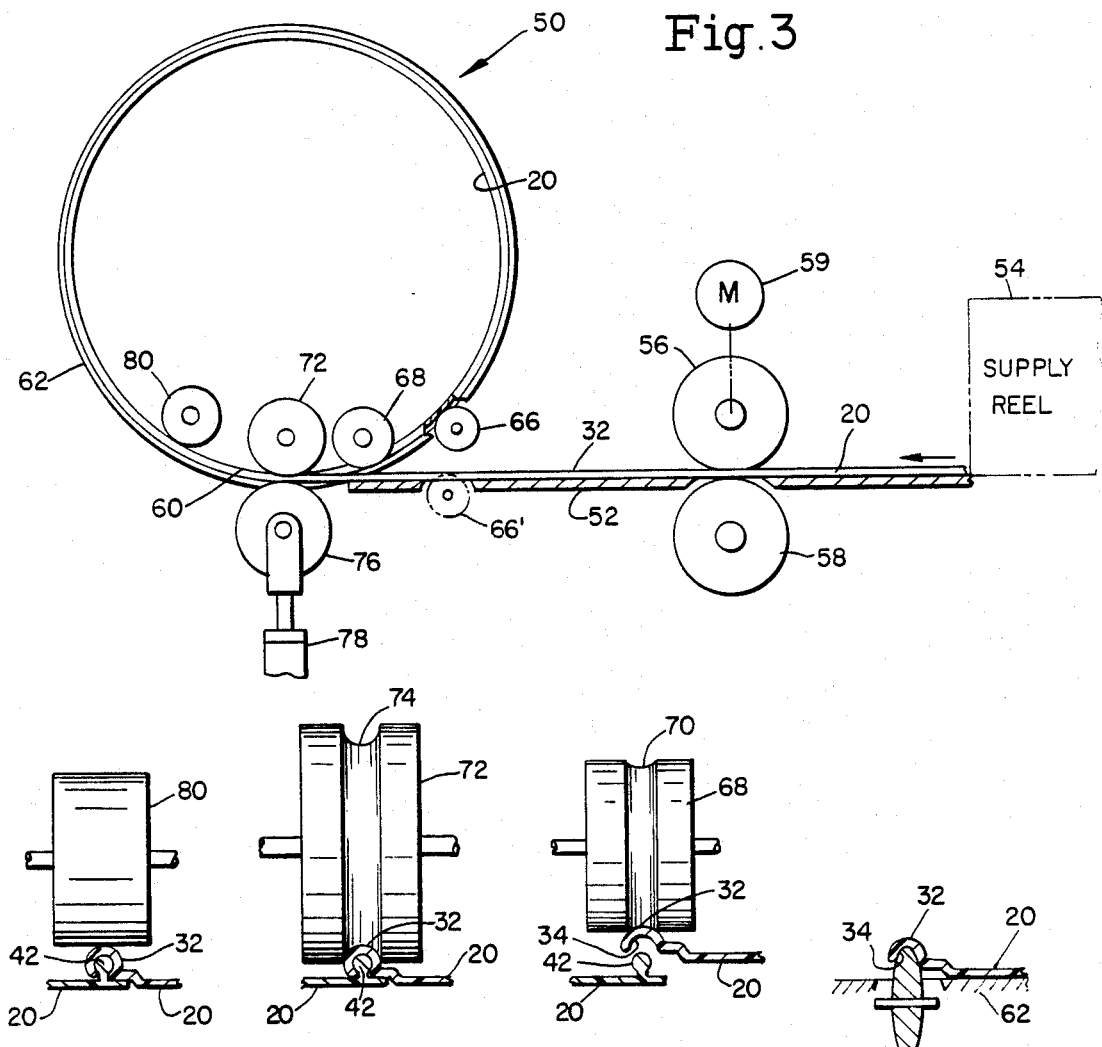
Fig.3
Fig.7    Fig.6    Fig.5    Fig.4
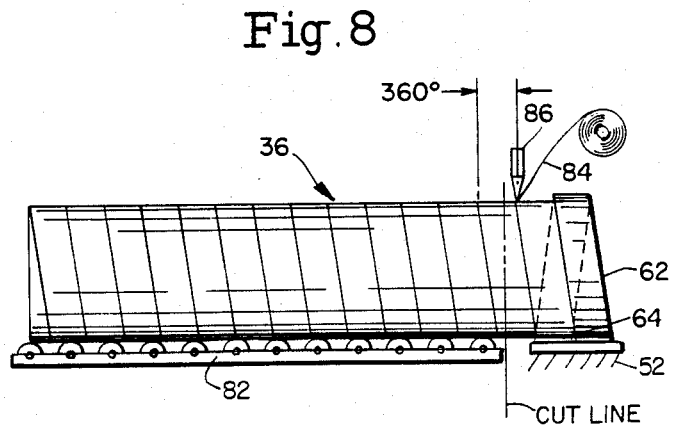
Fig.8

PLASTIC LOCKSEAM TUBING AND METHOD FOR MAKING

This application is a continuation, of application Ser. No. 687,144, filed Dec. 28, 1984 and now abandoned.

This application pertains to a spiral plastic tube with interlocking helical seams made from a strip of high density polyethylene material which is fed into a special spiral pipe making machine which winds and interlocks the edges of the strip. Such tubing is used for ducts and pipes and when filled with expanded polystyrene beads can be used very advantageously as flotation devices.

Prior to the present invention it was not possible to successfully make pipes or tubes of spiral high molecular weight (HMW) high density polyethylene interlocking strips, particularly in the requisite diameters. Pipes or tubes made from polyethylene material have been made by an extrusion process resulting in an integral cylincrical unit. However such extruded tubes are limited to small diameters for several reasons. In order to maintain cylindrical integrity of the extruded product when working with a high density polythylene the wall thickness must be of sufficient dimension to enable the heated soft extrusion to retain a circular cross-section of consistent dimension. One can satisfactorily make small pipes or tubes but, as the diameter increases, the wall thickness must be substantially increased to avoid extreme deformation of heated, soft extruded tube. That increases the cost of dies and the amount of material needed becomes economically unfeasible. Thus it is highly desirable to be able to make large diameter tubing from specially configured thin wall strips by helically winding and interlocking the strips.

There are numerous patents directed to spiral tubes, hoses or pipes made from plastic. However none teach a product which has the large diameter thin walled configuration necessary to satisfy the requirements of spiral plastic pipe in diameters necessary for ducting, sewerage lines and flotation devices required in the field to which this invention pertains. Many of the prior art patents use plastic strips with interengaging ribs and grooves but most of them require a sealing adhesive in the seam or the seam is heat sealed.

The following U.S. Patents are considered pertinent but the structures taught by those patents have not satisfied the criteria which resulted in the present invention. U.S. Pat. No. 3,495,628 to J. C. P. Boender is for a tubular construction which results in a spiral tube with double wall construction having adhesively sealed seams. U.S. Pat. No. 4,209,043 to J. M. Menzel for Plastic Tubular Objects has a spiral strip with interlocking bayonet ribs and multiple thin stiffening ribs between the edges of the strip forming the spiral tube. U.S. Pat. No. 4,337,564 to W. O. Menzel et al for a Machine and Method for Forming Tube from a Strip shows a machine which forms a spiral tube from the strip such as shown in U.S. Pat. No. 4,209,043. U.S. Pat. No. 4,362,187 to A. Harris et al for a Spirally-Formed Thermoplastic Tube. None teach constructing a spiral plastic tube made with the strip configuration or made from HMW high density polyethylene as has been developed by applicants.

The initial purpose of this invention was to develope a thin wall, medium or high-density polyethylene pipe for use as the shell in flotation devices to satisfy a need for pontoons which would avoid rust and corrosion yet would not be inordinately expensive. Nothing available on the market could satisfy the need. It was anticipated that, other uses of plastic thin-wall pipes could be for large diameter, internally smooth pipes or duct applications and, while a primary objective was to make the tube from the high density polyethylene, it was also anticipated that success in making a pipe or tube of such high density plastic could be applied in making thin-walled spiral tubes of other kinds of plastics.

Applicants are not aware of any prior art which teaches making a high density polyethylene spiral tube construction, nor such a tube filled with expanded polystyrene beads fitted with end caps of the same high density, or the like polyethylene, for use as pontoons or similar flotation devices.

Accordingly a primary object of the present invention resides in the provision of a novel spiral plastic tube made from a strip of plastic with unique edge constructions providing a bead formation along one edge of the strip and a groove formation along the opposite edge of the strip, which can enable an interlocked helical seam, in the spiral tube.

A still further object resides in the provision of a spiral plastic tube as described in the preceding paragraph wherein the plastic used is HMW high density polyethylene. The tube can be made by winding the strips so the resultant joinder ribs will be on the exterior or on the interior tube surface.

Still another object resides in construction of a flotation unit such as a pontoon in which the shell is a high density polyethylene spiral pipe made in accord with the foregoing and wherein the ribs are internal, the shell has caps on each of its ends and the interior is filled with expanded polystyrene beads.

Other objects of the invention reside in the following aspects: a pipe, duct or tube of polyethylene with a thin wall, strong enough to resist puncture, yet thin enough to be economical; a method of manufacture which allows a wide variation in diameters at a minimum of cost relating to each diameter; a pipe which has a smooth wall on its outside; a pipe which can be quickly made when needed without requiring a large inventory of a variety of sizes to be stored; a manufacturing method which allows a pontoon shell to be manufactured at the location for filling and foaming with plastic beads in a minimum of space and with a minimum of equipment; and the strip from which the tube or pipe is made can be made of various widths, various thicknesses, other material and various colors.

Further novel features and other objects of this invention will become apparent from the following detailed description, discussion and the appended claims taken in conjunction with the accompanying drawings.

BRIEF DESCRIPTION OF DRAWINGS

A preferred structural embodiment of the spiral tube and the plastic strip of this invention and a machine for making the tube are disclosed in the accompanying drawings in which:

FIG. 3 is a diagrammatic view of a machine specifically developed to feed the preformed plastic strip into a spiral tube forming and interlocking apparatus viewed along the axis of the forming mandrel and the resulting tube;

FIGS. 4, 5, 6 and 7 are detail section views of the several rollers, seen in FIG. 3 which enable and provide interlocking of the two edges of the plastic strip as the tube is continuously being formed;

FIG. 8, is a diagramatic side view of the machine seen in FIG. 3, to illustrate a step of integrating a portion of the helical sea adjacent what will be the end of finite length of the tube;

GENERAL DESCRIPTION

The original concept of the invention involved the obtaining of a suitable thin-walled plastic cylinder for use as the shell for pontoons previously made with a metal shell containing a polystyrene core. In connection with that type of use the kind of plastic which evidenced the desirable properties was a polyethylene with high density and high molecular weight primarily because it has a high degree of corrosion resistance, superior mechanical strength, is somewhat rigid, yet has a characteristic of flexibility, retains a memory and has an excellent characteristic of providing a sealed joinder when two areas are held in abutment with each other.

Figure 1:
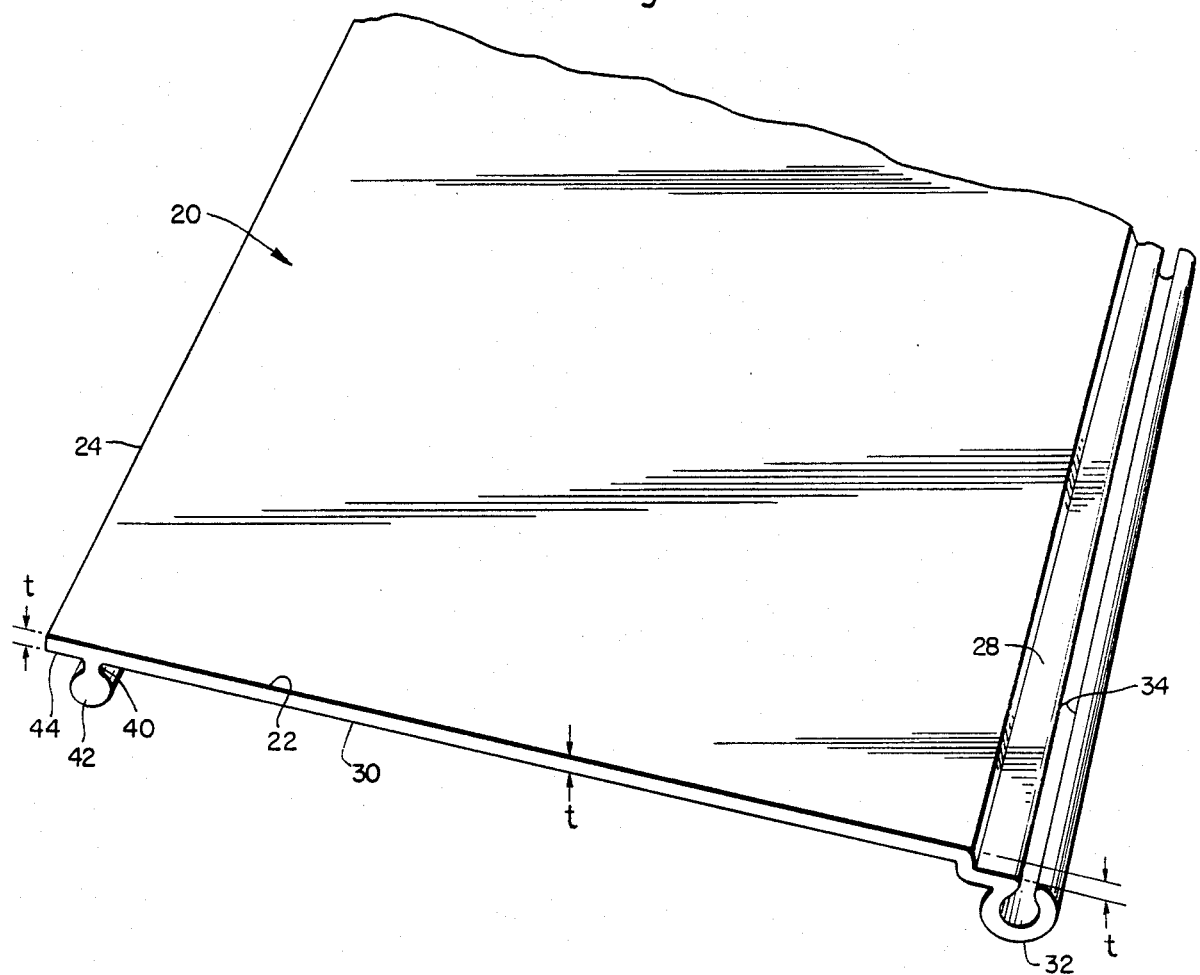
FIG. 1 illustrates a portion of the plastic strip part of this invention with the end configuration facing the viewer being a cross-section across the width of the strip.

To satisfy the need for such a thin-walled tube a spiral pipe or tube with an interlocked seam was developed but first a plastic strip of satisfactory configuration for that plastic has to be developed. FIG. 1 illustrates the final successful strip 20 made with a flat planar shape having special edge configuration and which can be extruded from a polyethylene with high molecular weight and a high density and still obtain the desired uniformity of cross-section. By extrusion the length of the strip can be made continuous. As a practical matter the strips are extruded in finite lengths and wound into rolls for shipment.

FIG. 1 is drawn at a slightly reduced scale from, but dimensions of an actual satisfactory such strip, are that the width is approximately 7 inches (180 mm.) and the wall thickness is approximately 0.125 inch (2 mm.). While those dimensions provide a good basic strip, width and thickness can be varied. Approximate practical ranges for such a strip configuration at economical costs can be from 6-12 inches in width and from 0.10 to 0.250 inch in thickness.

A suitable diameter tube used for pontoon shells is 18 inches and as a practical matter the above noted 7 inch strip can be used to make tubes in the range from 12-42 inches in diameter. Practical limits would be determined by the drive force necessary to push the strip into and around the machine's spiral forming mandrel shown in FIGS. 3 and 8.

Figure 2:
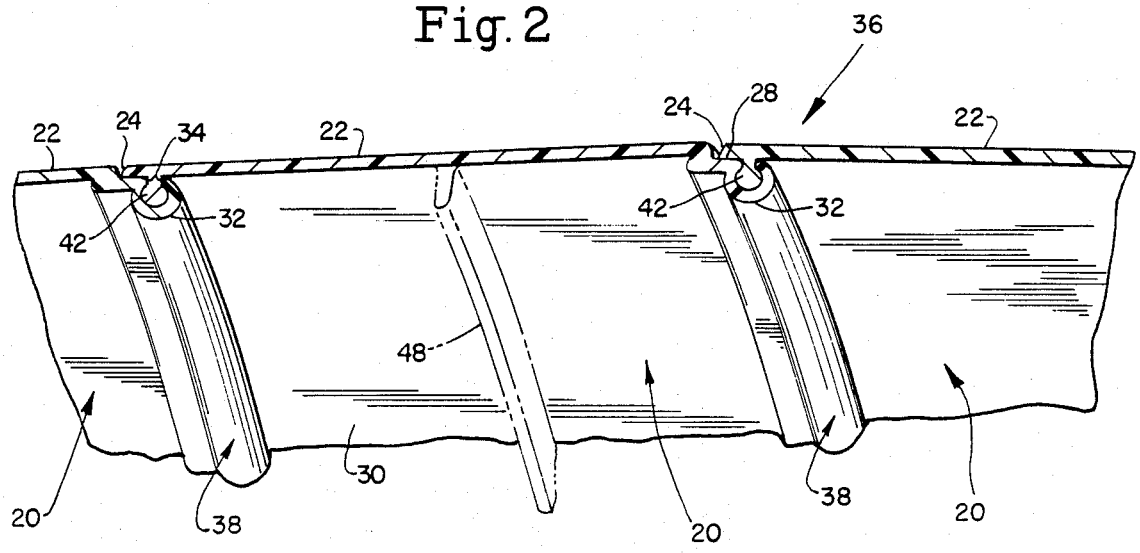
FIG. 2 is a detail view of part of a spiral tube showing a longitudinal section through the interlocked seams of the spiral strip, the resulting ribs being shown on the interior of the tube.

With specific reference to FIGS. 1 and 2, the planar strip 20 has a constant width and is essentially flat on one side 22. One edge 24 of the strip is a straight edge along the flat surface 22 while the other edge 26 is formed to provide a stepped narrow flange portion 28 (or ledge) which is parallel with and stepped toward the other side 30 a distance t equal to the thickness t of the wall of the strip. Along the edge of the narrow flange 28 the plastic material is shaped to provide a C-shaped channel 32 with its channel throat 34 running parallel with and open toward the plane of side 22. The closed bight of the channel 32 projects from and in a direction normal to the other side 30 of the strip and, in the final formed spiral tube 36 (FIG. 2) results in an internal helical rib 38 spiralling along the length of the tube.

Adjacent to but spaced from the straight edge 24 is a integral rib projection constituting a stem 40 terminating in an round or circular bead 42. The beaded stem 40 projects from and normal to side 30 of the plastic strip and extends along the entire length of the strip 20 and is offset from edge 24 a distance slightly less than the width of the narrow stepped flange portion 28 and has the same thickness t as the strip 20 and the step distance of the ledge 28. The dimension of the stem thickness is at least equal to the dimension across the throat 34 of the C-shaped channel and the diameter of the bead 42 is at least equal to the diameter of the circular inner surface of the C-shaped channel 32. In other words the external shape of the beaded stem projection is complementary to the internal shape of the C-shaped channel. Thus, when the strip is spiralled into a tube shape, the stemmed bead 42 will be placed into and interlocked between the legs of the C-shaped channel 32 and the short flange 44 provided between the stem 40 and the strip edge 24 will be received in and along the stepped ledge 28 adjacent the C-shaped channel 32. Thus the adjoined spiralled surface 22 of the interlocked strip become an essentially uninterrupted or laminar surface as distinguished from the other surface which has the projected helical rib formation 38.

Figure 12:
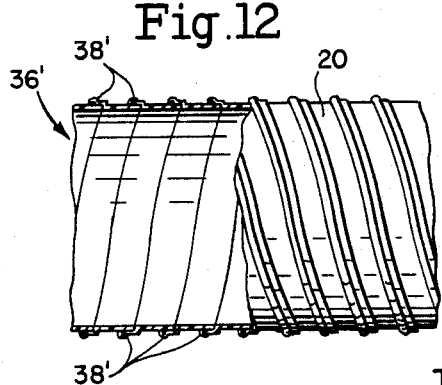
FIG. 12 illustrates a duct made with the interlocking spiral seam ribs on the exterior and with a smooth interior surface.

FIG. 2 shows the helical rib formation 38 as being on the inner surface of the spiral tube 36, which is desirable when the tube is used as the shell for a pontoon as will become apparent later in this description. If the tube is intended to be used as an air duct or as a sewer pipe or the like, such as shown in FIG. 12, the internal surface should be smooth and therefore the strip 20' would be spiralled into an interlocked spiral tube 36' with the helical rib 38' on the external surface. In either form of spiral tube, an advantage of making the tube from high density high molecular weight polyethylene is that the material after interlocking the bead and the channel assumes its original designed shape, due to inherent memory, whereby the stem 40 and head 42 are effectively clamped between the legs of and within the C-shaped with a gripping surface abutment that results in an effective sealed arrangement at the interlocked seam.

SPIRAL TUBE MACHINE

To make the spiral plastic pipe, a machine somewhat like a spiral pipe machine used to make metal spiral pipe was developed but made with components specifically shaped to correlate and cause interlocking of the complementary formations on the opposite edges of the plastic strip. FIGS. 3 and 4-7 are a diagrammatic illustration of the machine 50 and some of the special components which coact with the plastic strip.

In FIG. 3, the strip 20 feeds horizontally along a flat table 52 from a supply reel 54, which is a large roll of the plastic strip material. Strip 20 passes under a drive roller 56 with a knurled cylinder surface pressed against the flat surface 30 of the strip 20 and pressing the other surface 22 of the strip against a lower roll 58 which can be power driven in synchronization with roller 58 or it can merely be a back-up idler roller. The drive power is derived from a motor M, rotating the rollers 56 and 58 and pushing the plastic strip 20 along the table 52 and into the entry end 60 of a spiral forming mandrel 62 made from heavy steel plate. Such feed mechanism and spiral forming mandrels are essentially like those in prior art machines used to make spiral sheet metal pipe and per se are not described in further detail herein.

However in making and interlocking the edges of spiral plastic tubes various specially shaped devices are used. To make the plastic duct with internal ribs, the strip 20 will be fed along table 52 with the bead and channel edge formations projected upward in FIG. 3 and with the C-shaped channel formation 32 on the side edge of the strip 20 which faces the viewer. As the strip is forced into the entry portion 60 of the mandrel 62 it will be guided around the inner surface of the mandrel, by means such as side flanges (not shown) on the mandrel, into a helical turn of approximately 360 degrees inside the mandrel. The terminal end 64 (See FIG. 8) of the mandrel 62 extends past the 360 degree spiral turn. After the strip has spiralled along the mandrel to about the 330 degree location a device called a splitter roll 66 (see also FIG. 4) engages into the throat of the C-shaped channel and forces the semi-rigid plastic material of the channel to a spread open shape seen in FIG. 4. Due to the nature of the high density polyethylene the C-shaped channel stays spread apart a sufficient time before the plastic memory causes it to resume the C-shape and thereby permits the channel to be snapped over the part of the bead formation on the other edge of the strip which is passing into the entry 60 of the mandrel at the lower dead center location in FIG. 3.

The splitter roll 66 can be located just before the feed-in entrance to the mandrel 62 as shown by roller 66' in phantom lines in FIG. 3. However, when the channel is spread at that location, the plastic memory of the strip causes the channel to revert closer to its original shape because the strip must progress through more than a 360 degree path before the bead and channel engage. Such a condition requires a greater force to press the channel onto the bead, with a correlated need of greater feed forces.

To maintain the strip location in the spiral shape while the splitter roll 66 is forcing the channel to a spread condition a first guide roll 68 is engaged by the opened channel 32 (see FIG. 5). Roll 68 has a shallow curved groove 70 which engages the spread out channel surface and guides the channel rib down onto the stemmed bead 42 on the other edge of strip 20. During the spiralling progression of strip 20 the channel 32 is returning to its C-shape to grip the stemmed bead 42 which is now disposed in the channel 32 (see FIG. 6). As the intergaged channel and bead pass bottom center the channel engages a second roller 72 which has a semi-circular annular groove 74 in its periphery shaped to match the original exterior shape of the C-shaped channel 32. To assure interlocking of the bead and channel, a cylindrical pressure roll 76 located below the roll 72 forces the infeeding portion of strip 20 and the spiralled portion of strip 20 along the not engaged bead and channel edges tight against the second guide roll 72 assuring the interlocked relationship. Roller 76 is forced up by a hydraulic ram 78. A similar ram powered pressure roller is often found in sheet metal spiral pipe machines although used to accomplish a different operation. i.e., to finally bend and press down seam edges of the sheet metal strip.

At this stage the strip is spirally joined at its coextensive edges and passes out from the terminal end 64 of the mandrel 62. One or more small idler guide rolls 80 can be used as desired to help guide the spiralling strip through the mandrel until the tube passes to the conveyor table 82.

FIG. 8 illustrates a step in forming finite lengths of the plastic spiral tube 36. In a manner which is similar to that used in sheet metal spiral pipe machines the spiralling tube is cut by a saw (not shown) as it spirals along the table 82. The saw progresses along the table at the same rate of progression of the length of spiral tube until the tube has rotated 360 degrees providing a cut end on the tube 36 which is normal to the tube axis. The saw is then removed from the cut and returned toward the mandrel. To assure the integrity of joinder of the helical seam where the ends are cut, an approximately 240 degree segment of the helical seam is heat welded with a string 84 of the same high density polyethylene and a heat seaming gun 86, the helical turn which is heat welded at the seam being a turn which effectively equidistantly brackets the line of cut where the tube will be cut by the saw. When the cut is made, each end will have approximately 140° of the seam welded together. This prevents the pointed end of the strip from disconnecting from the adjacent strip portion.

PONTOON STRUCTURE

Figure 9:
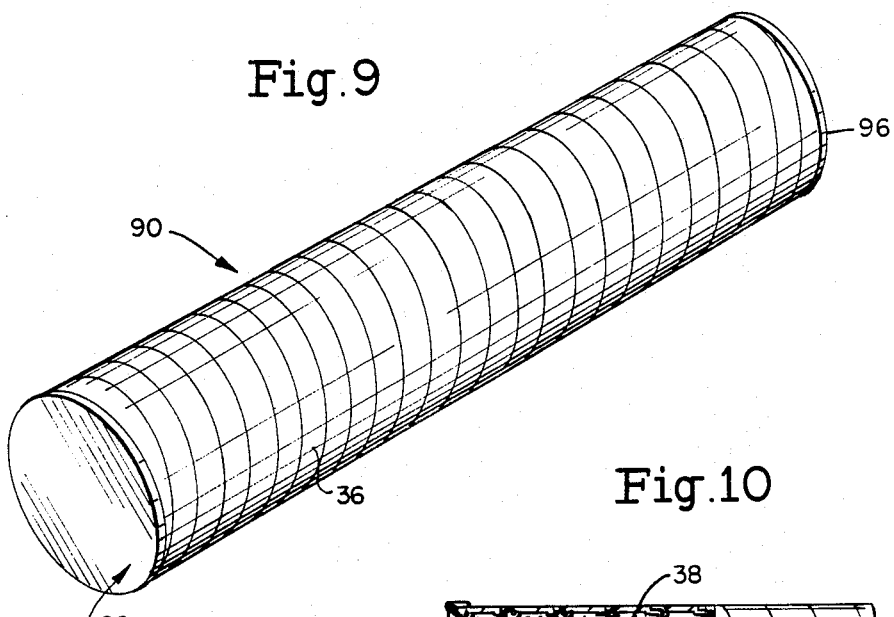
FIG. 9, is a perspective view of a pontoon flotation structure made in accord with the invention.
Figure 10:
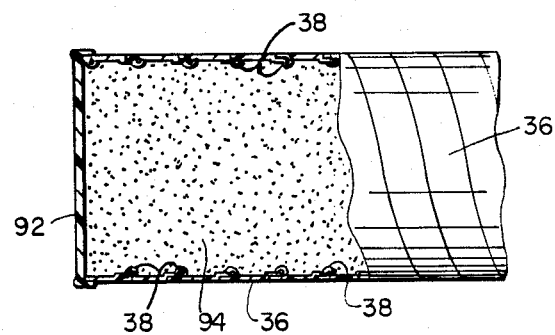
FIG. 10, is a detail, partially sectioned longitudinal view of the pontoon of FIG. 9.

FIGS. 9 and 10 are referred to in describing the construction of a pontoon 90 or flotation device.

A pontoon 90 is made from a shell casing which is a finite length of the plastic spiral tube hereinbefore described. Such flotation devices have previously been made with a metal shell. No suitable and economically feasible plastic shell was known prior to the present invention. Plastic, particularly the high molecular weight high density polyethylene from which the plastic tube of this invention is made can now be made as spiral pipe. The shell is at least cost effective relative to sheet metal and results in a better pontoon unit which has high strength and is not susceptible to corrosion from water and minerals as is a sheet metal shell. The process of making the pontoon is old in making sheet metal shell pontoons but the plastic shell pontoon is not old.

In making the pontoon 90, a finite length of plastic spiral tubing 36 is capped at one end by a plastic end cap 92 secured as by heat welding or other means such as screws or bolts. The shell 36 is then filled with polystyrene beads 94. By a known method, e.g., a steam injection tube inserted along the length of the shell and clamped via a steel end plate on the other end, the mass of polystyrene beads are heated (foamed) and expanded to a solidified integral mass of expanded beads which conform against the inner surface of the shell and lock in surrounding relationship with the inner helical ribs 38 of the helical seam of the shell 36. The steam heat is turned off and after a predetermined period of time the polystyrene mass solidifies, assures the cylindrical configuration of the thin shell and is interlocked securely inside the shell. The steam tube and end plate are removed and a second plastic end cap 96 is secured on the opposite end of the shell in the same manner as the first end cap 92. The resultant flotation device is an excellent pontoon filled with a polystyrene block of still sealed expanded beads and retains its bouyancy indefinitely, and resists corrosion essentially indefinitely. Preferably but not necessarily, the plastic end caps can be made from the same high density material as is the tube.

Figure 11:
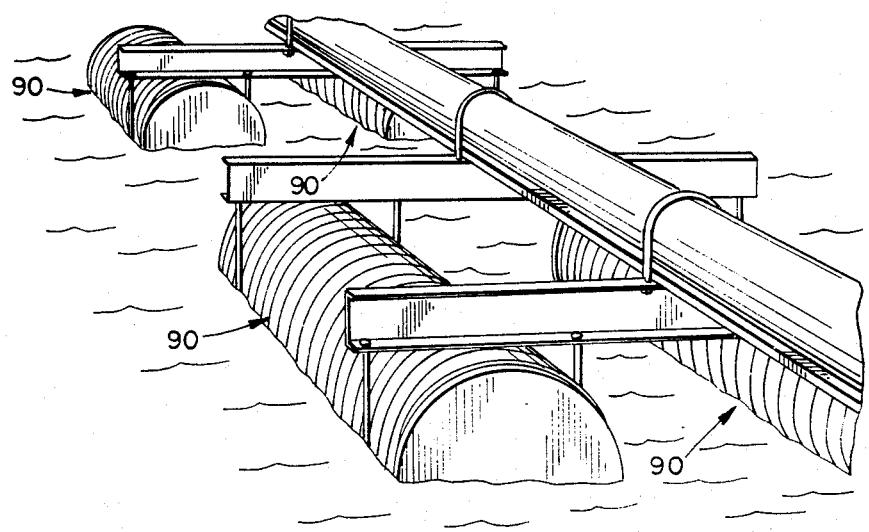
FIG. 11 illustrates one application of use of such pontoons to support a pipeline passing over a body of water.

Such devices are used for floating structures such as floating docks. Bath or boat houses, wharfs, causeways, and as floating supports for a pipe line as show in FIG. 11.

If desired the strip 20 can be extruded to include one or more short intermediate ribs 48, such as shown in phantom lines in FIG. 2, which would provide additional rigidity to the circular form of the tube.

The invention may be embodied in other specific forms and aspects without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A plastic lock seam spiral tube assembly comprising: a strip made from polyethylene material, formed as an essentially planar elongate strip of constant with, said width being at least several inches, having a thickness greater than 1 mm., having straight edges along its length and with formations along each side edge of said planar strip, disposed essentially normal to the planar aspect of such strip and both formations projecting from the same side of said strip; one of said formations constituting a stem strip integral with the planar strip and including an integral substantially circular bead at its terminal edge, said stem strip being inset from the associated edge of said planar strip to define a short planar edge flange substantially the thickness of and on said strip; the other of said formations constituting a lateral flange integral and parallel with the planar strip and stepped offset in the direction of said formation's projection a distance substantially equal to the thickness of said planar strip and integral with the end of said step flange, said other formation providing a C-shaped channel with internal channel formation complementing the shape of said bead and with the dimension between the legs of the C-shaped formation substantially equal to the thickness across said bead stem; said strip being disposed in a helical spiral configuration so that said projected bead is disposed in said C-shaped channel and the legs of said C-shaped channel encompass said bead and engage said bead stem strip to interlock the edges of said planar strip in a helical tube and said short planar edge flange is disposed in and along the step of said stepped lateral flange on the other of said edge formations; whereby one of the inner or outer surfaces of the helical spiral tube is essentially laminar along the length of the tube and the other of said surfaces has a helical projection formation resulting from the channel shaped formation along its length.

2. A plastic lockseam spiral tube assembly as defined in claim 1, wherein said strip is approximately 175 mm. in width and its thickness is approximately 2 mm.

3. A plastic lockseam spiral tube assembly as defined in claim 1, wherein said strip has a width dimension approximately in the range of 6-12 inches, a thickness dimensionn approximately in the range of 0.10-0.250 inch and said tube has a diameter approximately in the range of 12-42 inches.

4. A plastic lockseam spiral tube assembly as defined in claim 1, wherein said material is high density polyethlene.

5. A plastic lockseam spiral tube assembly as defined in claim 4, wherein said material consists solely of high-molecular-weight high density polyethylene.

6. A plastic lockseam spiral tube assembly as defined in claim 1, wherein said helical projection formation is on the external surface of the tube.

7. A plastic lockseam spiral tube assembly as defined in claim 1, wherein the said helical projection formation is on the internal surface of the tube.

8. A plastic lockseam spiral tube assembly as defined in claim 7, wherein tube assembly is a flotation device, said tubing having a finite length with each end being circular and substantially normal to the axis of the tube, an end cap secured to each end of said tube, said tube being filled with polystyrene beads and said beads being expanded to an integral internal mass providing a cylindrical shape and further providing cylindrical integrity to said tube and also being interlocked with said helical projection formation on the inner surface of said tube.

9. A plastic lockseam spiral tube flotation device as defined in claim 8, wherein said strip is approximately 175 mm. in width and its thickness is approximately 2 mm.

10. A plastic lockseam spiral tube flotation device as defined in claim 9, wherein the diameter of said tube is approximately 18 inches.

11. A plastic lockseam spiral tube flotation device as defined in claim 8, wherein said material is high density polyethylene.

12. A plastic lockseam spiral tube flotation device as defined in claim 11, wherein said material consists solely of high-molecular-weight high density polyethylene.

13. A spiral plastic tube made from a strip of plastic material with longitudinal edge constructions providing a bead formation along one edge of the strip and a complementarily shaped groove formation along the opposite edge of the strip, which can enable an interlocked helical seam, in the spiral tube, wherein said strip of plastic material consists solely of high-molecular-weight high density polyethylene.

14. For use in making thin plastic lock seam spiral tube: a strip made from polyethylene material formed as an essentially planar elongate strip of constant width, said width being at least several inches, having a thickness greater than 1 mm., having straight edges along its length and with formations along each side edge of said planar strip, disposed essentially normal to the planar aspect of such strip and both formations projecting from the same side of said strip; one of said formations constituting a stem strip integral with the planar strip and including an integral substantially circular bead at its terminal edge, said stem strip being inset from the associated edge of said planar strip to define a short planar edge flange substantially the thickness of and on said strip; the other of said formations constituting a lateral flange integral and parallel with the planar strip and stepped offset in the direction of said formation's projection a distance substantially equal to the thickness of said planar strip and integral with the end of said step flange, said other formation providing a C-shaped channel with internal channel formation complementing the shape of said bead and with the dimension between the legs of said C-shaped formation substantially equal to the thickness across said bead stem.

15. A plastic lockseam spiral tube strip as defined in claim 14, wherein said strip is approximately 175 mm. in width and its thickness is approximately 2 mm.

16. A plastic lockseam spiral tube strip as defined in claim 14, wherein said strip has a width dimension approximately in the range of 6–12 inches and a thickness dimension approximately in the range of 0.10–0.250 inch.

17. A plastic lockseam spiral tube strip as defined in claim 14 wherein said material is high density polyethylene.

18. A plastic lockseam spiral tube strip as defined in claim 17, wherein said material consists solely of high-molecular-weight high density polyethylene.

19. The method of making a plastic lockseam spiral tube as defined in claim 1 from the polyethylene strip as defined in claim 1, comprising supplying a said strip from a supply source along a flat table with the strip laying planar on the table, gripping and power driving said strip into the entry of a spiral pipe machine helically coiled mandrel and through a 360 degree helical turn so that the formation on one edge of said strip will overlap the formation on the other edge of said strip after a 360 degree turn; forcing said C-shaped channel to a spread open conduction just prior to completion of the 360 degree turn; maintaining a coiled shape of said strip while said strip is progressing to an overlapped condition; causing interlocking of said C-shaped channel and said beaded edge formation as the strip completes the 360 degree turn; and upon interlocked engagement applying force on the bight portion of said C-shaped formation to force said C-shaped channel back into its original configuration in tight engagement with said beaded strip.

20. The method of forming a plastic lockseam spiral tube as defined in claim 19, wherein said strip is supplied along said table with the edge formations projecting in direction resulting in disposition on the inner surface of the coiled strip as it passes through the mandrel whereby the seam resulting from the interlocked channel strip and bead strip is a helical rib projection located on the interior of the resultant tube.

* * * * *